S. S. UNDERWOOD.
BRAKE BEAM HANGER.
APPLICATION FILED FEB. 21, 1910.
965,964.
Patented Aug. 2, 1910.
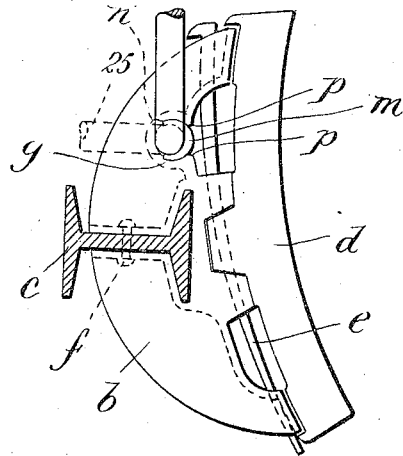
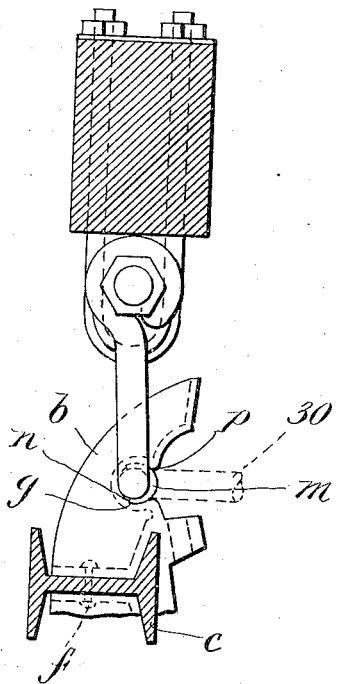
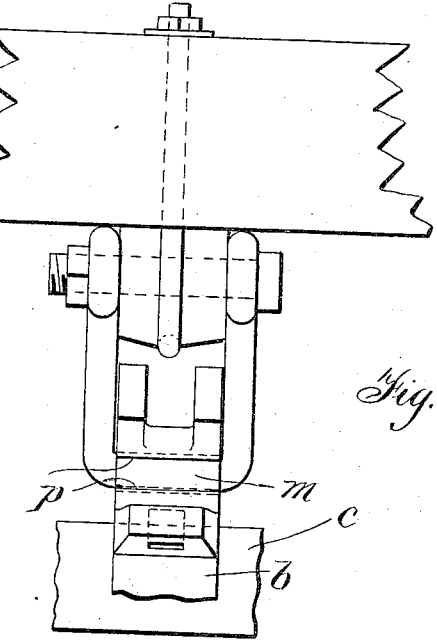
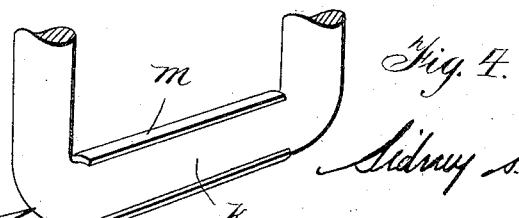

UNITED STATES PATENT OFFICE.

SIDNEY SMITH UNDERWOOD, OF MONTREAL, QUEBEC, CANADA.

BRAKE-BEAM HANGER.

965,964.   Specification of Letters Patent.   Patented Aug. 2, 1910.

Application filed February 21, 1910. Serial No. 545,093.

*To all whom it may concern:*

Be it known that I, SIDNEY SMITH UNDERWOOD, of the city of Montreal, Province of Quebec, Canada, have invented certain new and useful Improvements in Brake-Beam Hangers; and I do hereby declare that the following is a full, clear, and exact description of the same.

The invention has for its object to prevent the brake head and with it the beam from becoming disengaged from the hanger in the event of the brake shoe key being removed; and it may be said briefly to consist of the particular construction of the hanger hereinafter described and pointed out in the claims.

For full comprehension, however, of my invention reference must be had to the accompanying drawings, forming a part of this specification, in which similar reference characters indicate the same parts, and wherein—

Figure 1, is a side elevation of a brake head with brake shoe in place, the brake beam being shown in transverse section, and the whole supported by my improved hanger; Fig. 2, is a side elevation of the upper portion of the brake head and a part of the truck, the latter in sectional view, with my improved hanger engaged therewith. Fig. 3, is a face view of the parts illustrated in Fig. 2, and Fig. 4, is a detail perspective view of my improved hanger removed.

The brake head $b$, beam $c$, shoe $d$, and key $e$, for detachably fastening the shoe to the head are of usual construction and well known in the art, there being, of course, a pair of heads and shoes on each beam, and a pair of hangers suspending the brake heads and through them the shoes and beam. The brake heads are fixed to the brake beam by rivets $f$ or otherwise, and each is formed with a transverse socket $g$ having a longitudinal mouth the lips $p$ whereof reduce its width to less than the diameter of the socket $g$ in which the horizontal portion $k$ of its hanger has heretofore been held by the key. This arrangement is defective for the reason that unauthorized persons are enabled to disengage the brake heads, shoes and beam from the hanger by simply removing the keys, and the same disengagement would take place at one or both ends if either or both keys should happen to be displaced by breakage. In order to overcome this defect I so construct the hanging means that the heads will be self held against displacement from the hanger while the latter is attached to the truck and readily either set in place in the socket of the head or freed therefrom when the hanger is disconnected from the truck.

The present embodiment of my invention consists of a one piece hanger of U-form whereof the horizontal portion $k$ is substantially equal in diameter to the space between the lips of the socket $g$ to permit it to be passed either sidewise or endwise into the socket, the thickness of the legs permitting the endwise insertion.

The member which locks the brake head and hanger together and is locked itself against displacement by the said parts and therefore constitutes means whereby all of these parts are interlocked, consists of a bushing $m$ preferably of substantially crescent cross-section, the wall of the socket being preferably chambered as at $n$ to accommodate it and enable the back portion of the wall to move closely approximate the circumferential surface of the part $k$ of the hanger.

To assemble the brake head and hanger either the bushing is first placed upon the hanger and, the hanger thus furnished, is inserted endwise into the socket, or the hanger is first inserted, endwise or sidewise and the bushing subsequently driven into place. The effect is that the hanger is free to rotate in the bushing and held by the bushing against lateral displacement and it is prevented from longitudinal displacement by the legs straddling the upper portion of the head; while the bushing itself is locked in the chambered portion of the socket by the hanger. With this construction and arrangement the brake heads and beams are positively locked against displacement from the hanger while the latter is connected to the truck, and worn or broken brake shoes may be replaced with new ones, or the shoes stripped from the heads by unauthorized persons, without danger of displacement of the heads and beam.

The bushing can be removed and replaced by turning the hanger or the head to bring the legs of the hanger to position extending toward the back of the head (see dotted lines 25 in Fig. 1.) with the ends of the bushing clear of the legs, the bushing can then be driven out of either end and a new one replaced; or to remove both hanger and bushing simultaneously the hanger should be swung to the position shown in dotted lines 30 Fig. 2 and driven out of either end the legs carrying the bushing with them.

Means for permitting the hanger to enter the socket endwise is not claimed broadly herein as it is covered in my Patent No. 942,985 granted December 14, 1909.

What I claim is as follows:—

1. The combination with a brake-head and hanger of means engaging the bearing portion of the hanger and locking the same to the brake-head and such means being locked in place by one of the said parts.

2. The combination with a brake head having a transverse socket with a longitudinal mouth of less measurement transversely to the socket than the diameter of the said socket, of a hanger the bearing part whereof is adapted to enter the socket, and means for locking the hanger against displacement from the socket such means being locked in place by the hanger and wall of the socket.

3. The combination with a brake head having a transverse socket with a longitudinal mouth of less measurement transversely to the socket than the diameter of the said socket, of a hanger, and means distinct from the head and coacting with the hanger and adapted to permit the hanger to enter the socket and retain the same therein against other displacement than rotary.

4. The combination with a brake head having a transverse socket with a longitudinal mouth of less measurement transversely to the socket than the diameter of the said socket, of a hanger of U-form one of the legs whereof is less in diameter than the said measurment of the mouth of the socket, and a bushing engaging the horizontal portion of the hanger and permitting the insertion of such horizontal portion furnished with the bushing longitudinally into the socket.

5. The combination with a brake head having a transverse socket with a longitudinal mouth of less measurement transversely to the socket than the diameter of the said socket, of a hanger of U-form one of the legs whereof is less in diameter than the said measurement of the mouth of the socket, and a bushing of substantial crescent cross-section engaging the horizontal portion of the hanger and permitting the insertion of such horizontal portion furnished with the bushing longitudinally into the socket.

In testimony whereof, I have signed my name to this specification, in the presence of two subscribing witnesses.

SIDNEY SMITH UNDERWOOD.

Witnesses:
WILLIAM P. McFEAT,
FRED J. SEARS.